United States Patent
Uemura

(10) Patent No.: US 7,746,091 B2
(45) Date of Patent: Jun. 29, 2010

(54) SENSOR APPARATUS

(75) Inventor: Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/576,590

(22) Filed: Oct. 9, 2009

(65) Prior Publication Data

US 2010/0097088 A1 Apr. 22, 2010

(30) Foreign Application Priority Data

Oct. 16, 2008 (JP) .............................. 2008-267023

(51) Int. Cl.
*G01R 31/02* (2006.01)
(52) U.S. Cl. ...................................................... 324/763
(58) Field of Classification Search ......... 324/763–765, 324/158.1; 73/488, 504.12

See application file for complete search history.

(56) References Cited

U.S. PATENT DOCUMENTS

| 7,233,847 | B2 * | 6/2007 | Otsuka | 701/34 |
| 2005/0216149 | A1 * | 9/2005 | Kato | 701/29 |
| 2009/0007663 | A1 * | 1/2009 | Uemura | 73/504.15 |

FOREIGN PATENT DOCUMENTS

| JP | 08-327363 A | 12/1996 |
| JP | 2001-074503 A | 3/2001 |
| JP | 2004-264074 A | 9/2004 |
| JP | 2005-331332 A | 12/2005 |
| JP | 2008-002890 A | 1/2008 |

* cited by examiner

*Primary Examiner*—Ha Tran T Nguyen
*Assistant Examiner*—Arleen M Vazquez
(74) *Attorney, Agent, or Firm*—Pearne & Gordon LLP

(57) ABSTRACT

The present invention includes an output circuit section for digitally outputting from an output terminal in a time division system a failure detection signal from a failure diagnosis circuit and a sense signal from a process circuit section, leading to reduction in size of a sensor apparatus. Further, outputting a failure detection signal earlier than a sense signal leads to improvement in reliability at the time of abnormality.

3 Claims, 3 Drawing Sheets

SENSOR APPARATUS

FIELD OF THE INVENTION

The present invention relates to a sensor apparatus for use in automobiles, a variety of electronic devices, and the like.

BACKGROUND OF THE INVENTION

A conventional sensor apparatus of this kind is described with reference to a drawing. FIG. 3 is an electric circuit diagram showing a conventional sensor apparatus.

As shown in FIG. 3, the sensor apparatus includes: first and second drive circuit sections 1A, 1B each for outputting a drive signal that drives detection device 2; and first and second detection circuit sections 3A, 3B each for fetching a response signals from detection device 2. The sensor apparatus further includes: first and second process circuit sections 4A, 4B, into which response signals from first and second detection circuit section 3A, 3B are inputted and each of which divides the response signal into a monitor signal and a sense signal; and first and second output circuit sections 5A, 5B for outputting sense signals, divided by first and second process circuit sections 4A, 4B, from output terminals 7A, 7B.

The apparatus has been configured such that failure diagnosis circuit 6 targets for failure diagnosis at least one of first and second drive circuit sections 1A, 1B, detection device 2, first and second detection circuit sections 3A, 3B, and first and second process circuit sections 4A, 4B, and in the case of detecting failure, failure diagnosis circuit 6 outputs a failure detection signal from output terminal 8 provided therein. Hereinafter, an object for failure diagnosis is also referred to as a failure diagnosis object section.

It is to be noted that as related art document information concerning this application, for example, Unexamined Japanese Patent Publication No. H08-327363 (Patent Document 1) is known.

Such a conventional sensor apparatus has had a problem of having difficulties in reducing its size.

Specifically, in the above conventional configuration, output terminals 7A, 7B included in first and second output circuit sections 5A, 5B and output terminal 8 included in failure diagnosis circuit 6 are present, and with such a large number of terminals, the reduction in size has been difficult.

SUMMARY OF THE INVENTION

A sensor apparatus of the present invention includes an output circuit section having an output terminal for digitally outputting in a time division system a failure detection signal from a failure diagnosis circuit and a sense signal from a process circuit section, the apparatus being configured such that a period of time required for an output concerning a failure detection signal from an object for failure diagnosis to reach the output terminal through the failure diagnosis circuit is shorter than a period of time required for an output concerning a sense signal from the object for failure diagnosis to reach the output terminal.

In other words, it is configured such that the failure detection signal is outputted earlier than the sense signal.

With this configuration, the sense signal and the failure detection signal can be outputted from the same output terminal, to reduce the number of output terminals so as to realize reduction in size of the sensor apparatus. Further, outputting the failure detection signal earlier than the sense signal can improve the reliability at the time of abnormality.

DESCRIPTION OF THE EXEMPLARY EMBODIMENT

Figure 1:
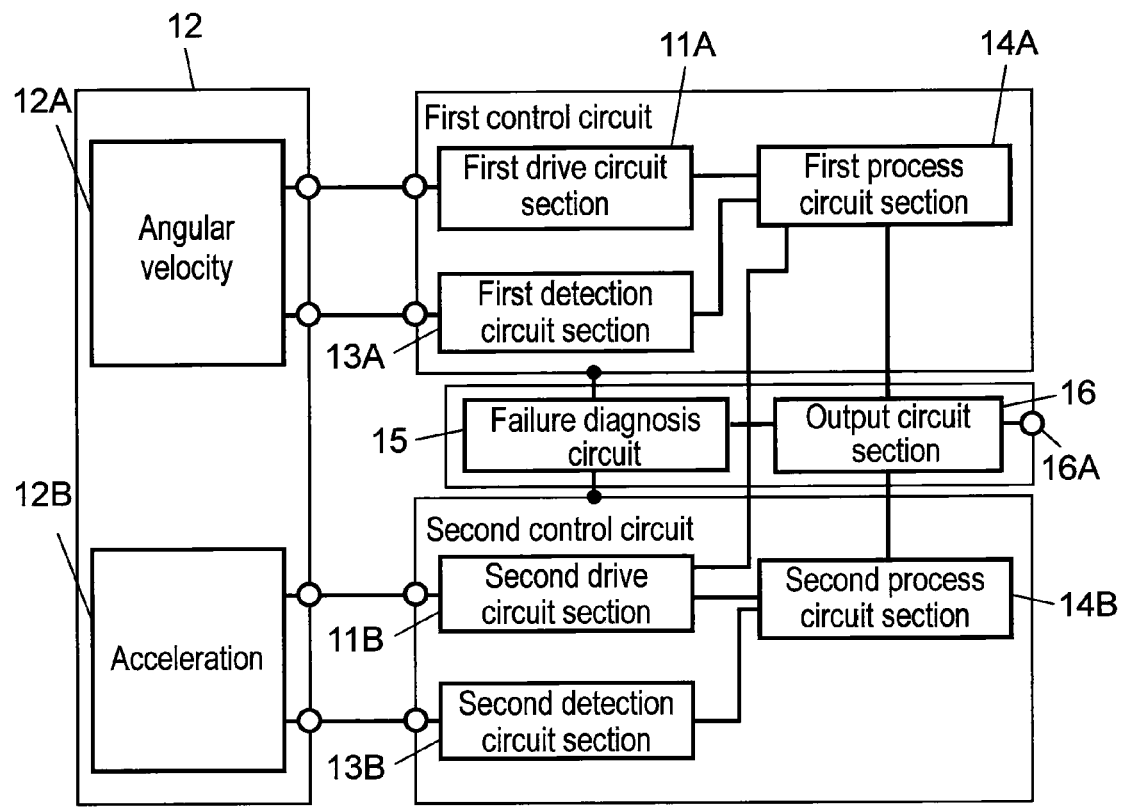
FIG. 1 is an electric circuit diagram showing a sensor apparatus of the present invention.

A description will be given below of a sensor apparatus as an inertia sensor in an embodiment of the present invention with reference to drawings. FIG. 1 is an electric circuit diagram showing a sensor apparatus of the present invention.

The sensor apparatus in the present embodiment has detection device 12 including angular velocity detection device 12A and acceleration detection device 12B. As shown in FIG. 1, the sensor apparatus includes: first and second drive circuit sections 11A, 11B each for outputting a drive signal to detection device 12; angular velocity detection device 12A, into which a first drive signal from first drive circuit section 11A is inputted; and acceleration detection device 12B, into which a second drive signal from second drive circuit section 11B is inputted. The sensor apparatus further includes: first detection circuit section 13A for fetching a first response signal from angular velocity detection device 12A; and second detection circuit section 13B for fetching a second response signal from acceleration detection device 12B. The sensor apparatus further includes first process circuit section 14A, into which a first response signal from first detection circuit section 13A is inputted, and which divides this first response signal into a first monitor signal and a first sense signal, to fetch the first sense signal. The sensor apparatus further includes second process circuit section 14B, into which a second response signal from second detection circuit section 13B is inputted, and which divides this second response signal into a second monitor signal and a second sense signal, to fetch the second sense signal.

First drive circuit section 11A adjusts vibration amplitude of a first drive signal based upon a first monitor signal from first process circuit section 14A. Second drive circuit section 11B adjusts vibration amplitude of a second drive signal based upon a second monitor signal from second process circuit section 14B.

At least one of first drive circuit section 11A, angular velocity detection device 12A, first detection circuit section 13A, and first process circuit section 14A is set as a first failure diagnosis object section. Further, at least one of second drive circuit section 11B, acceleration detection device 12B, second detection circuit section 13B and second process circuit section 14B is set as a second failure diagnosis object section. Failure diagnosis circuit 15 determines whether first and second failure diagnosis object sections are normal or abnormal, and output a failure detection signal in the case of abnormality.

Output circuit section 16 digitally outputs from output terminal 16A in a time division system a failure detection signal from failure diagnosis circuit 15 and first and second sense signals from first and second process circuit sections 14A, 14B.

It is configured such that a period of time required for an output concerning a failure detection signal from each of the first and second failure diagnosis object sections to reach output terminal 16A through failure diagnosis circuit 15 is shorter than a period of time required for an output concerning each of first and second sense signals from the diagnosis object sections to reach output terminal 16A.

Specifically, for example, failure diagnosis circuit 15 is electrically connected to both first detection circuit section 13A and second detection circuit section 13B, to set first detection circuit section 13A as the first failure diagnosis object section, and set second detection circuit section 13B as the second failure diagnosis object section. Failure diagnosis circuit 15 determines whether each of first and second detection circuit sections 13A, 13B is normal or abnormal.

A period of time required for an output concerning each of failure detection signals to be transmitted to output terminal 16A from first and second detection circuit sections 13A, 13B as first and second failure diagnosis object sections through failure diagnosis circuit 15 is referred to as T1. Meanwhile, a period of time required for an output concerning each of first and second sense signals, namely first and second response signals to reach output terminal 16A from first and second detection circuit sections 13A, 13B is referred to as T2. In the present invention, it is configured such that the period of time T1 is shorter than the period of time T2, that is, the failure detection signal is outputted earlier than first and second sense signals.

With such a configuration, it is possible to output a sense signal and a failure detection signal from one output terminal 16A of output circuit section 16 without providing an extra output terminal in failure diagnosis circuit 15, thus resulting in realization of reduction in size of the sensor apparatus.

Further, with the configuration where a failure detection signal is outputted from output terminal 16A earlier than first and second sense signals, the first and second sense signal at the time of abnormality are not erroneously used for control of an automobile or the like, thereby to allow improvement in reliability.

In other words, if it is configured such that first and second sense signals are outputted earlier than a failure detection signal from output terminal 16A, the failure detection signal is not outputted in time at the time of abnormality despite failure having already been detected in practice, and hence there is a possibility that the first and second sense signals at the time of abnormality may be used for control of an automobile or the like.

However, since a failure detection signal from failure diagnosis circuit 15 can be outputted from output terminal 16A earlier than first and second sense signals as results at the time of abnormality, it is possible to prevent the use of first and second sense signals for control of an automobile or the like, so as consequently to improve the reliability.

It is to be noted that in the present embodiment, the example was described where first and second detection circuit sections 13A, 13B are set as the first and second failure diagnosis object sections, and the identical parts respectively in the angular velocity detection system and the acceleration detection system are set as the failure diagnosis object sections. However, it may be configured such that non-identical parts respectively in the angular velocity detection system and the acceleration detection system may be set as the two failure diagnosis object sections, as in a case where first drive circuit section 11A is set as the first failure diagnosis object section and second process circuit section 14B is set as the second failure diagnosis object section. In that case, it is necessary to configure such that a shorter one between respective periods of transmission time for outputs concerning first and second sense signals from the first and second failure diagnosis object sections to output terminal 16A is referred to as T2, while a longer one between respective periods of transmission time for outputs concerning failure detection signals from the first and second failure diagnosis object sections to output terminal 16A is referred to as T1, and the period of time T1 is shorter than the period of time T2. This is because of making the failure detection signal outputted from output terminal 16A earlier than the first and second sense signals.

It should be noted that in the present embodiment, the description was given using the two devices, angular velocity detection device 12A and acceleration detection device 12B, as detection device 12 and also using, as the circuit configuration corresponding thereto, the configuration having first and second drive circuit sections 11A, 11B, first and second detection circuit sections 13A, 13B, and first and second process circuit sections 14A, 14B. However, one detection device 12 may be provided and as a circuit configuration corresponding thereto, a configuration may be formed to provide only each one drive circuit section, detection circuit section, and process circuit section.

In addition, although detection device 12 was the component of the sensor apparatus in the present embodiment, the present invention can be configured even with detection device 12 provided outside the sensor apparatus. Specifically, the sensor apparatus of the present invention can be configured by including a drive circuit section, a detection circuit section, a process circuit section, a failure diagnosis circuit and an output circuit section, which exchange signals with detection device 12 provided outside the sensor apparatus.

Figure 2:
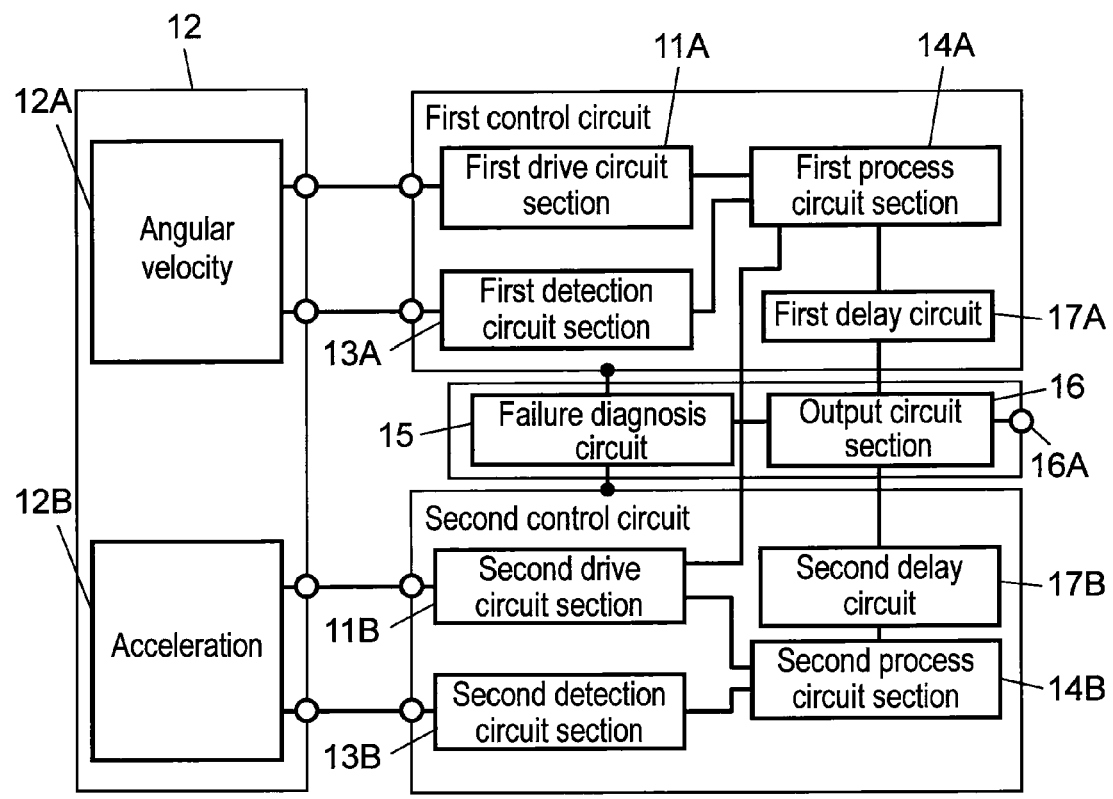
FIG. 2 is an electric circuit diagram showing another example of the sensor apparatus of the present invention.
Figure 3:
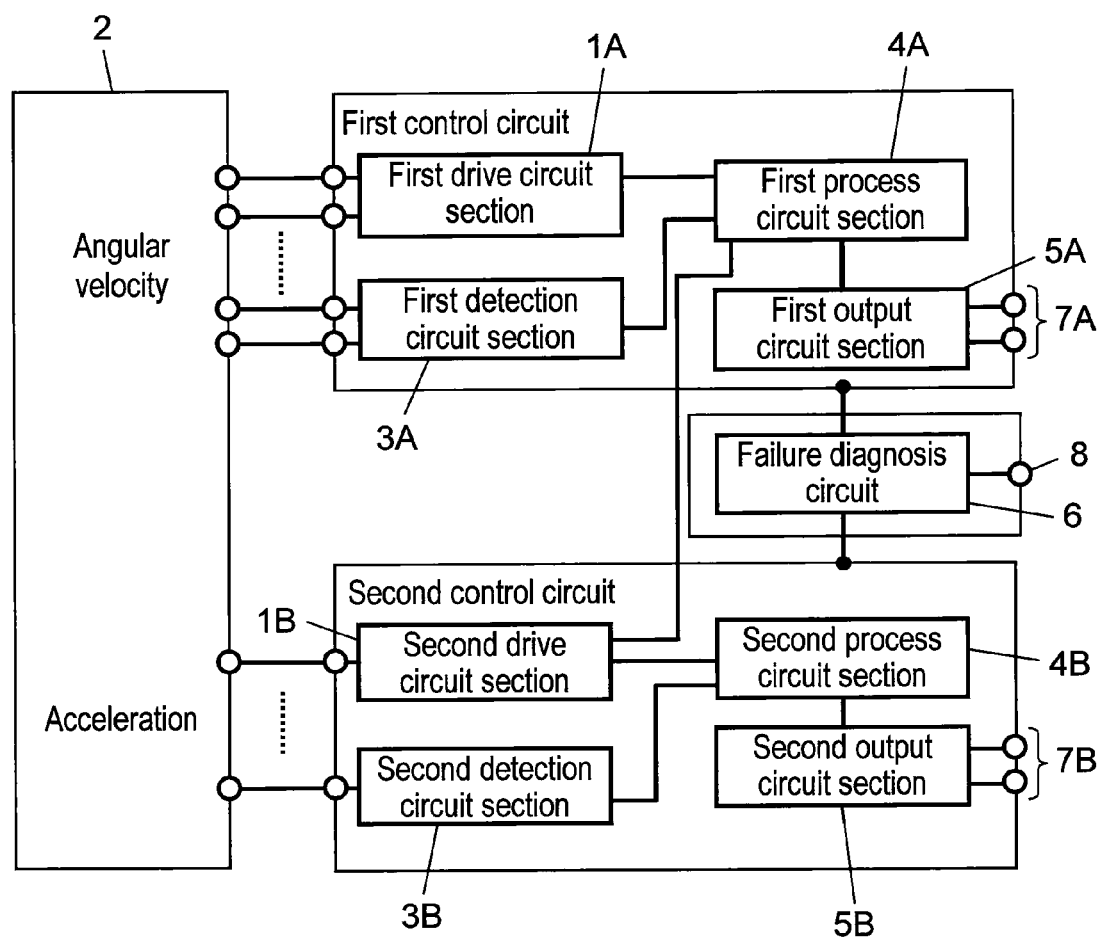
FIG. 3 is an electric circuit diagram showing a conventional sensor apparatus.

FIG. 2 is an electric circuit diagram showing another example of the sensor apparatus of the present invention. As shown in FIG. 2, first delay circuit 17A is provided at any place on an electric connection line from first drive circuit section 11A to angular velocity detection device 12A, first detection circuit section 13A, first process circuit section 14A, and to output terminal 16A. Second delay circuit 17B is provided at any place on an electric connection line from second drive circuit section 11B to acceleration detection device 12B, second detection circuit section 13B, second process circuit section 14B, and to output terminal 16A. With first and second delay circuits 17A, 17B provided, delays can be generated in first and second sense signals, so as to make a failure detection signal outputted from output terminal 16A reliably earlier than first and second sense signals. This can result in preventing an object to be controlled, such as an automobile, from being controlled by means of an abnormal sense signal, thereby to more reliably obtain an effect concerning improvement in reliability, which is desirable.

Specifically, even in a case where processing in each circuit section takes time during a period of time for an output to reach output terminal 16A from first and second failure diagnosis object sections through failure diagnosis circuit 15, providing delay circuit 17A can make the period of time T1 for an output concerning a failure detection signal to reach output terminal 16A reliably shorter than the period of T2 for an output concerning each of first and second sense signals to reach output terminal 16A from the failure diagnosis object sections, which is desirable.

It is to be noted that, although the description was given using angular velocity detection device 12A, acceleration detection device 12B and the like in the present embodiment, other than those, a variety of sensor apparatus such as a pressure sensor can also be implemented.

In addition, it is desirably configured such that in the case of output circuit section 16 receiving from failure diagnosis circuit 15 a failure detection signal indicating abnormality of a failure diagnosis object section, output circuit section 16 halts outputting of a sense signal from its output terminal 16A. Determining about whether or not a sense signal is usable in an object to be controlled, such as an automobile, based upon a failure detection signal from the sensor apparatus is an unnecessary step to take, and the reliability can be improved by transmitting no sense signal to the object to be controlled at the time of abnormality.

The sensor apparatus of the present invention has the effect of allowing realization of reduction in size as well as high reliability, and is useful in a variety of electronic devices such as digital cameras and car navigation systems, as well as automobiles.

What is claimed is:

1. A sensor apparatus, comprising:
    a drive circuit section for outputting a drive signal;
    a detection device, into which a drive signal from the drive circuit section is inputted;
    a detection circuit section for fetching a response signal from the detection device;
    a process circuit section, into which the response signal from the detection circuit section is inputted and which fetches a sense signal from this response signal;
    a failure diagnosis circuit for setting as a failure diagnosis object section at least any one of the drive circuit section, the detection device, the detection circuit section and the process circuit section, to determine whether the failure diagnosis object section is normal or abnormal; and
    an output circuit section having an output terminal for digitally outputting in a time division system a failure detection signal from the failure diagnosis circuit and the sense signal from the process circuit section,
    wherein a period of time required for an output concerning the failure detection signal from the failure diagnosis object section to reach the output terminal through the failure diagnosis circuit is shorter than a period of time required for an output concerning the sense signal from the failure diagnosis object section to reach the output terminal.

2. The sensor apparatus according to claim 1, wherein a delay means is provided at any place on an electric connection line from the failure diagnosis object section to the output terminal.

3. The sensor apparatus according to claim 1, wherein the output circuit section does not output the sense signal from its output terminal when receiving the failure detection signal indicating abnormality of the failure diagnosis object section.

* * * * *